(12) United States Patent
Wen et al.

(10) Patent No.: US 11,297,649 B2
(45) Date of Patent: *Apr. 5, 2022

(54) DEVICE AND METHOD FOR SIGNAL PROCESSING IN LICENSED ASSISTED ACCESS RADIO SYSTEM

(71) Applicant: Telefonaktiebolaget LM Ericsson (publ), Stockholm (SE)

(72) Inventors: Gan Wen, Beijing (CN); Jinsong Yang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/026,116

(22) Filed: Sep. 18, 2020

(65) Prior Publication Data

US 2021/0084685 A1 Mar. 18, 2021

Related U.S. Application Data (63) Continuation of application No. 16/827,730, filed on Mar. 24, 2020, now Pat. No. 10,820,347, which is a (Continued)

(51) Int. Cl.
*H04W 16/14* (2009.01)
*H04W 74/08* (2009.01)
*H04L 27/26* (2006.01)

(52) U.S. Cl.
CPC ..... *H04W 74/0808* (2013.01); *H04L 27/2623* (2013.01); *H04W 16/14* (2013.01)

(58) Field of Classification Search
CPC ..... H04W 72/04; H04W 88/08; H04W 76/00; H04W 74/0808; H04W 16/14; H04L 27/2623

See application file for complete search history.

(56) References Cited

U.S. PATENT DOCUMENTS 6,504,862 B1 * 1/2003 Yang ............... H04B 1/707
375/146
8,351,490 B2 1/2013 Chen et al.
(Continued)

FOREIGN PATENT DOCUMENTS

| CN | 101136890 A | 3/2008 |
|---|---|---|
| CN | 101848182 A | 9/2010 |
| WO | 02/09373 A2 | 1/2002 |

OTHER PUBLICATIONS

European Search Report and Search Opinion, EP App. No. 17932408.2, dated May 10, 2021, 05 pages.
(Continued)

*Primary Examiner* — Hassan A Phillips
*Assistant Examiner* — Prenell P Jones
(74) *Attorney, Agent, or Firm* — NDWE LLP (57) ABSTRACT

A dynamic configuration of crest factor reduction in a licensed assisted access radio system. A processing device comprises a detecting block, a clipping pulse generator, a first storage block, a selecting block, a full clipping block and a simplified clipping block. The detecting block performs a listen-before-talk (LBT) procedure on a plurality of carriers in parallel and generates a trigger signal in response to LBT success on one or more carriers. The clipping pulse generator generates, for the carrier(s) with LBT success, a clipping pulse within a time period from the receipt of the trigger signal to the start of user traffic transmission. The first storage block stores the clipping pulse for use by the full clipping block. The selecting block selects the full clipping block when there is user traffic on the carrier(s) and selects the simplified clipping block when there is no user traffic on the carrier(s).

20 Claims, 7 Drawing Sheets

Related U.S. Application Data continuation of application No. PCT/CN2017/111595, filed on Nov. 17, 2017.

(56) References Cited

U.S. PATENT DOCUMENTS

| | | |
|---|---|---|
| 11,039,382 B2* | 6/2021 | Niu .................... H04B 1/7156 |
| 2005/0123025 A1 | 6/2005 | Sorrells et al. |
| 2005/0135494 A1* | 6/2005 | Kybett ............... H04L 27/2621 375/260 |
| 2011/0075745 A1* | 3/2011 | Kleider ............... H04L 27/2623 375/260 |
| 2016/0028574 A1 | 1/2016 | Wang |
| 2016/0212002 A1* | 7/2016 | Xiong ................ H04L 27/2624 |
| 2017/0187550 A1 | 6/2017 | Kim et al. |
| 2018/0084555 A1* | 3/2018 | Mori ........................ H04B 7/00 |
| 2018/0279211 A1 | 9/2018 | Lunttila et al. |
| 2018/0302905 A1 | 10/2018 | Fodor et al. |
| 2019/0110325 A1 | 4/2019 | Gulati et al. |
| 2020/0084763 A1 | 3/2020 | Harada et al. |
| 2020/0336973 A1* | 10/2020 | Niu ..................... H04L 5/0094 |

OTHER PUBLICATIONS

Helen Tam et al: "3GPP LTE Digital Front End Reference Design—XAPP1123", Oct. 29, 2008 (Oct. 29, 2008), XP055027192, Retrieved from the Internet: URL:http://read.pudn.com/downloads160/doc/718492/LTE DFE App Note.pdf.

International Search Report and Written Opinion of International Application No. PCT/CN2017/111595, dated Jul. 27, 2018, 8 pages.

Notice of Allowance, U.S. Appl. No. 16/827,730, dated Jun. 22, 2020, 11 pages.

* cited by examiner

DEVICE AND METHOD FOR SIGNAL PROCESSING IN LICENSED ASSISTED ACCESS RADIO SYSTEM

CROSS-REFERENCE TO RELATED APPLICATIONS

This application is a continuation of application Ser. No. 16/827,730, filed Mar. 24, 2020, which is a continuation of International Application No. PCT/CN2017/111595, filed Nov. 17, 2017, which are all hereby incorporated by reference.

TECHNICAL FIELD

Embodiments of the disclosure generally relate to wireless communication, and, more particularly, to a processing device and a method for dynamic configuration of crest factor reduction (CFR) in a licensed assisted access (LAA) radio system as well as a radio unit comprising the processing device.

BACKGROUND

This section introduces aspects that may facilitate better understanding of the present disclosure. Accordingly, the statements of this section are to be read in this light and are not to be understood as admissions about what is in the prior art or what is not in the prior art.

With the rapidly growing demand of wireless network services, mobile network operators have made some efforts to explore unlicensed bands to offload data traffic from licensed bands. One of the options to achieve this end is license assisted access (LAA). As a new access technology in unlicensed bands, LAA deployment needs to co-exist with existing access technologies, such as WiFi, on a "fair" and "friendly" basis. This is typically ensured by a listen-before-talk (LBT) process.

On multi-carrier LAA radio, due to the independent channel status as well as the independent LBT process, the transmission process on each carrier will not be fully synchronized. This requires dynamic configuration of the carrier dependent settings, such as clipping pulse configuration for peak canceling-crest factor reduction (PC-CFR).

Currently, existing solutions for PC-CFR have low implementation complexity on the clipping operation, at the cost of high volume of clipping pulse calculation and downloading. Thus, they work well for the fixed carrier configuration in traditional radio, in which the clipping pulse is calculated and downloaded in the carrier setup/release phase only. However, they will meet lots of challenges when applied on multi-carrier LAA radio which requires real time dynamic configuration. Therefore, it would be desirable to provide a solution for dynamic configuration of PC-CFR on multi-carrier LAA radio.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a solution for dynamic configuration of PC-CFR on multi-carrier LAA radio.

According to one aspect of the disclosure, there is provided a processing device for use in an LAA radio system. The processing device comprises a detecting block, a clipping pulse generator, a first storage block, a selecting block, a full clipping block and a simplified clipping block. The detecting block is configured to perform an LBT procedure on a plurality of carriers in parallel and to generate a trigger signal in response to LBT success on one or more carriers among the plurality of carriers. The clipping pulse generator is configured to, in response to the trigger signal, generate, for the one or more carriers with LBT success, a clipping pulse within a time period from the receipt of the trigger signal to the start of user traffic transmission on the one or more carriers. The first storage block is configured to store the clipping pulse. The selecting block is configured to select a full clipping block to clip a peak in a multi-carrier signal corresponding to the plurality of carriers, based on the clipping pulse, when there is user traffic on the one or more carriers, and to select a simplified clipping block to apply a simplified clipping to the multi-carrier signal, without using the clipping pulse, when there is no user traffic on the plurality of carriers.

In an embodiment of the disclosure, the clipping pulse generator comprises a second storage block, a frequency shifting block and a summing block. The second storage block is configured to store basis functions of the plurality of carriers. The frequency shifting block is configured to apply corresponding frequency shifts to the basis functions of the plurality of carriers. The summing block is configured to calculate a sum of the frequency-shifted basis functions of the one or more carriers with LBT success.

In an embodiment of the disclosure, the frequency shifting block is implemented as a non-real time calculation block that performs the calculation when there is a change in the carrier configuration. The summing block is implemented as a real time calculation block that performs the calculation in response to the trigger signal.

In an embodiment of the disclosure, the summing block comprises one or more calculation branches each of which comprises a third storage block, at least two pulse gates and a first summator. The third storage block is configured to store the frequency-shifted basis functions of the plurality of carriers. The at least two pulse gates are configured to assign corresponding weights to the frequency-shifted basis functions of at least two carriers read from the third storage block. Zero is assigned to the carrier without LBT success and one is assigned to the carrier with LBT success. The first summator is configured to calculate a sum of the weighted frequency-shifted basis functions.

In an embodiment of the disclosure, at least one of the one or more calculation branches has a pipelined structure.

In an embodiment of the disclosure, the selecting block comprises a multiplexer. The multiplexer has a first input port connected to an output of the full clipping block, a second input port connected to one end of a bypassing path, and an output port connected to an input of the simplified clipping block. The other end of the bypassing path is connected with an input of the full clipping block to receive the multi-carrier signal. The bypassing path comprises a delaying block configured to apply to the multi-carrier signal the same delay as applied by the full clipping block. The multiplexer is configured to output the multi-carrier signal from the first input port when there is user traffic on the one or more carriers, and to output the multi-carrier signal from the second input port when there is no user traffic on the plurality of carriers.

In an embodiment of the disclosure, the selecting block comprises a multiplexer. The multiplexer has a first input port connected to an output of the full clipping block, a second input port connected to an output of the simplified clipping block, and an output port configured to selectively output the multi-carrier signal from one of the first and second input ports. An input of the simplified clipping block is connected with an input of the full clipping block to receive the multi-carrier signal. The multiplexer is configured to output the multi-carrier signal from the first input port when there is user traffic on the one or more carriers, and to output the multi-carrier signal from the second input port when there is no user traffic on the plurality of carriers.

In an embodiment of the disclosure, the selecting block comprises a switch element. The switch element has an input port configured to receive the multi-carrier signal, a first output port configured to output the multi-carrier signal when there is user traffic on any one of the plurality of carriers, and a second output port configured to output the multi-carrier signal when there is no user traffic on the plurality of carriers.

In an embodiment of the disclosure, an input of the full clipping block is connected to the first output port of the switch element, and an input of the simplified clipping block is connected in series to an output of the full clipping block. The selecting block further comprises a bypassing path with one end connected to the second output port of the switch element and the other end connected to the output of the full clipping block. The bypassing path comprises a delaying block configured to apply to the multi-carrier signal the same delay as applied by the full clipping block.

In an embodiment of the disclosure, an input of the full clipping block is connected to the first output port of the switch element, and an input of the simplified clipping block is connected to the second output port of the switch element. An output of the full clipping block is connected with an output of the simplified clipping block to output the multi-carrier signal.

In an embodiment of the disclosure, the full clipping block comprises a peak detecting block and a peak cancelling block. The peak detecting block is configured to detect a peak in the multi-carrier signal. The peak cancelling block is configured to apply the clipping pulse to the multi-carrier signal to reduce the peak.

In an embodiment of the disclosure, the simplified clipping block comprises a hard clipping block and a low pass filter. The hard clipping block is configured to apply a hard clipping to the multi-carrier signal. The low pass filter is configured to apply low pass filtering to the hard-clipped multi-carrier signal.

According to another aspect of the disclosure, there is provided a radio unit (RU) for use in a radio device. The RU comprises the processing device according to the above aspect.

In an embodiment of the disclosure, the radio device is a base station or a terminal device.

According to another aspect of the disclosure, there is provided a method implemented in an LAA radio system. The method comprises performing an LBT procedure on a plurality of carriers in parallel. The method further comprises, in response to a trigger event that LBT success occurs on one or more carriers among the plurality of carriers, generating, for the one or more carriers with LBT success, a clipping pulse within a time period from the occurrence of the trigger event to the start of user traffic transmission on the one or more carriers. The method further comprises clipping a peak in a multi-carrier signal corresponding to the plurality of carriers based on the clipping pulse when there is user traffic on the one or more carriers. The method further comprises applying a simplified clipping to the multi-carrier signal without using the clipping pulse when there is no user traffic on the plurality of carriers.

In an embodiment of the disclosure, generating the clipping pulse comprises applying corresponding frequency shifts to basis functions of the plurality of carriers. Generating the clipping pulse further comprises calculating a sum of the frequency-shifted basis functions of the one or more carriers with LBT success.

In an embodiment of the disclosure, applying the corresponding frequency shifts is performed when there is a change in the carrier configuration. Calculating the sum of the frequency-shifted basis functions is performed in response to the trigger signal.

In an embodiment of the disclosure, calculating the sum of the frequency-shifted basis functions of the one or more carriers comprises assigning corresponding weights to the frequency-shifted basis functions of the plurality of carriers. Zero is assigned to the carrier without LBT success and one is assigned to the carrier with LBT success. Calculating the sum of the frequency-shifted basis functions of the one or more carriers further comprises calculating a sum of the weighted frequency-shifted basis functions.

In an embodiment of the disclosure, clipping the peak in the multi-carrier signal comprises detecting a peak in the multi-carrier signal. Clipping the peak in the multi-carrier signal further comprises applying the clipping pulse to the multi-carrier signal to reduce the peak.

In an embodiment of the disclosure, applying the simplified clipping comprises applying a hard clipping to the multi-carrier signal. Applying the simplified clipping further comprises applying low pass filtering to the hard-clipped multi-carrier signal.

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, in the existing solutions for PC-CFR on traditional radio, the clipping pulse is calculated and downloaded to a PC-CFR block only if there is a carrier configuration change. Although this will prolong the radio initialization time, it is still acceptable since the carrier configuration change rarely happens in field.

However, for LAA radio, its real-time transmission depends on the LBT result, and the carrier transmission status may vary time to time. Thus, it requires PC-CFR to have real-time clipping pulse calculation/downloading capability. This typically may be achieved by two ways.

The first way is to pre-calculate and store all the clipping pulses for all possible carrier combinations, and choose the clipping pulse according to the LBT result. It works for radio which has a small number of carriers supported. However, as the supported carrier type (e.g., for long term evolution (LTE) carrier type, there are 1.4 Mhz, 3 Mhz, 5 Mhz, 10 Mhz, 20 Mhz carriers) as well as the supported carrier number (e.g., 6 carriers) increase, it quickly becomes infeasible since the clipping pulse memory size becomes exploded.

The second way is to use a hardware acceleration engine to calculate the clipping pulse in real time according to the LBT result. This is also infeasible considering that the transmission process should start immediately after an LBT success to reserve the channel, but it is difficult for a hardware acceleration engine to finish the calculation and downloading in such a short time.

The present disclosure proposes a solution for dynamic configuration of PC-CFR on multi-carrier LAA radio. Hereinafter, the solution will be described in detail with reference to FIGS. 1-11.

Figure 1:
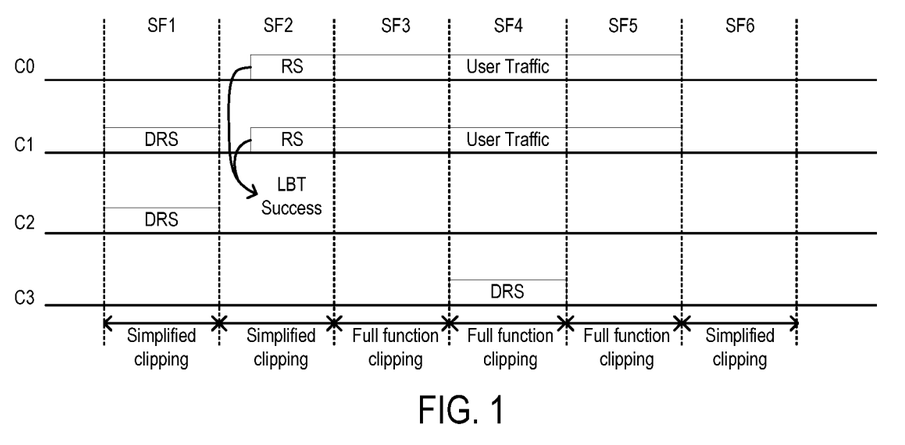
FIG. 1 is a schematic diagram illustrating the principle of the disclosure.

FIG. 1 is a schematic diagram illustrating the principle of the disclosure. As shown, there are basically three types of signal that will be transmitted on LAA radio: reservation signal (RS), discovery reference signal (DRS) and normal LTE subframe with user traffic. The RS is used to reserve the channel after an LBT success. It typically provides time/frequency synchronization to a UE. In LAA-LTE network, it is an empty LTE frame without any user traffic.

The DRS signal is periodically sent. It is typically used to provide radio resource management (RRM) functionality including cell identification. The signals constituting the DRS include primary synchronization signal (PSS), secondary synchronization signal (SSS), cell-specific reference signal (CRS) and optionally channel state information (CSI) reference signal (CSI-RS), but without any user traffic.

Accordingly, on multi-carrier LAA radio, there are generally two states within a subframe. In the first state, there is user traffic on one or more carriers, and there is DRS or it is idle on other carriers. For example, in subframe 3 (SF3) and SF5, there is user traffic on the carriers C0 and C1, and it is idle on the other carriers C2 and C3. In SF4, there is user traffic on the carriers C0 and C1, there is DRS on the carrier C3, and it is idle on the carrier C2.

In the second state, there is DRS/RS on one or more carriers, and it is idle on the other carriers. For example, in SF1, there is DRS on the carriers C1 and C2, and it is idle on the other carriers C0 and C3. In SF2, there is RS on the carriers C0 and C1, and it is idle on the other carriers C2 and C3.

Since the DRS/RS has no user traffic sent, the average power is low and the probability of peak generation is also low when there is only DRS/RS transmission. Thus, it is not necessary to do a full function clipping all the time even when there is transmission ongoing. In view of this, the present disclosure proposes to apply different clipping strategy to the above two different states.

Specifically, for a subframe (or slot) in the above second state (with DRS/RS or idle on all the carriers), a simplified clipping can be applied to clip the peak in the downlink (DL) signal. The simplified clipping is for cancelling the rarely happened peaks for power amplifier protection purpose, and thus does not need any re-configuration. For example, a hard clipping plus low pass filtering may be taken as the simplified clipping. In the example shown in FIG. 1, since SF1, SF2 and SF6 are in the second state, the simplified clipping can be applied.

For a subframe (or slot) in the above first state (with user traffic on one or more carriers), a full function clipping can be applied by calculating a clipping pulse for the one or more carriers according to the LBT result, and keeping the clipping pulse unchanged during the whole DL transmission period. In the example shown in FIG. 1, since SF3, SF4 and SF5 are in the first state, a clipping pulse can be calculated for the carriers C0 and C1 with LBT success, and the clipping pulse can keep unchanged during SF3, SF4 and SF5.

Thus, by using the above clipping strategies, the clipping pulse re-calculation for full PC-CFR clipping is only required to be done after an LBT success and before user traffic is transmitted. It should be noted that when there is DRS on other carriers (e.g., there is DRS on the carrier C3 in SF4), since the clipping pulse is calculated for only the carrier(s) with user traffic (e.g., the carriers C0 and C1), over-clipping will be applied on the carrier(s) with user traffic, which may affect the error vector magnitude (EVM) performance. However, this will not affect the emission performance.

Figure 2:
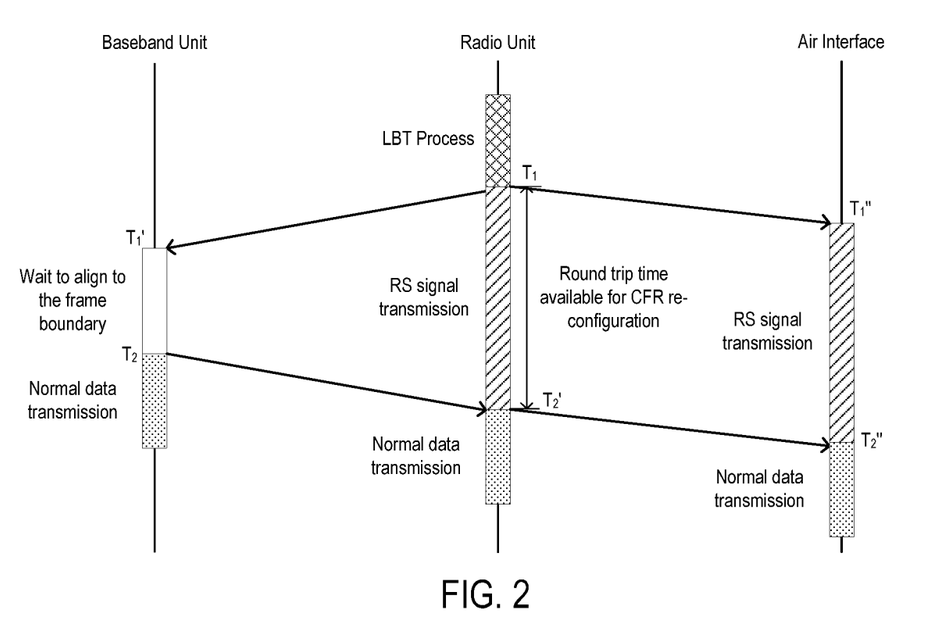
FIG. 2 is another schematic diagram illustrating the principle of the disclosure.

FIG. 2 is another schematic diagram illustrating the principle of the disclosure. As shown, at the radio unit of a base station, before the time point $T_1$, an LBT process (or procedure) is performed on a plurality of carriers in parallel. At $T_1$, LBT success occurs on one or more carriers. Thus, the radio unit signals the LBT result to the baseband unit. The radio unit also starts RS signal transmission.

Correspondingly, at $T_1'$, the baseband unit receives the LBT result. According to the LBT result, the baseband unit waits to align to the frame boundary $T_2$ at which normal data transmission is started on the one or more carriers with LBT success. Due to the delay between the baseband unit and the radio unit, the radio unit starts the normal data transmission at $T_2'$. Correspondingly, the air interface starts the RS signal transmission at $T_1''$ and starts the normal data transmission at $T_2''$.

Thus, according to the above clipping strategies, there shall be relatively long time available for the clipping pulse re-calculation, which is required by the full function clipping only. As shown, the available time at least includes the time for the LBT result to be signaled to the baseband unit, and the DL traffic transmission delay from the baseband unit to the radio unit. The round-trip time may reach up to tens of microseconds. In this way, the chip resource for clipping pulse re-calculation can be minimized by fully utilizing the available reconfiguration time.

Figure 3:
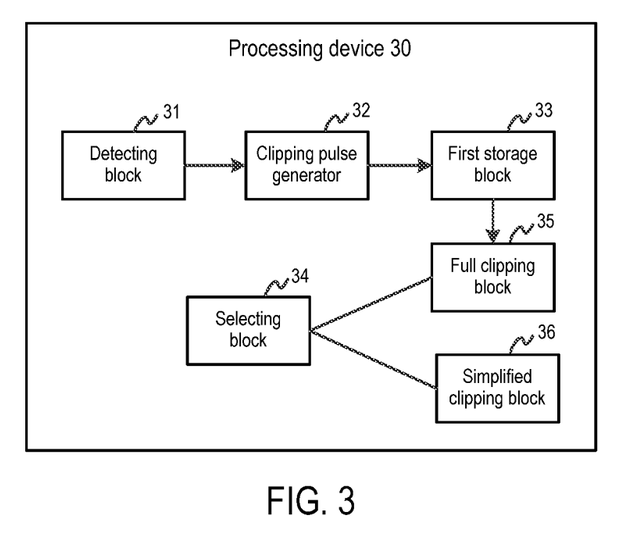
FIG. 3 is a block diagram showing a processing device according to an embodiment of the disclosure.

FIG. 3 is a block diagram showing a processing device according to an embodiment of the disclosure. The processing device may be, for example, a digital front end (DFE) in a radio unit of a base station. As shown, the processing device 30 comprises a detecting block 31, a clipping pulse generator 32, a first storage block 33, a selecting block 34, a full clipping block 35 and a simplified clipping block 36. The detecting block 31 is configured to perform an LBT procedure on a plurality of carriers in parallel and to generate a trigger signal in response to LBT success on one or more carriers among the plurality of carriers. The clipping pulse generator 32 is configured to, in response to the trigger signal, generate, for the one or more carriers with LBT success, a clipping pulse within a time period from the receipt of the trigger signal to the start of user traffic transmission on the one or more carriers. The first storage block 33 is configured to store the clipping pulse.

The selecting block 34 is configured to select the full clipping block 35 to clip a peak in a multi-carrier signal corresponding to the plurality of carriers, based on the clipping pulse, when there is user traffic on the one or more carriers, and to select the simplified clipping block 36 to apply a simplified clipping to the multi-carrier signal, without using the clipping pulse, when there is no user traffic on the plurality of carriers. Hereinafter, the implementing details of these components will be described in detail, respectively.

The Detecting Block

As described above, the detecting block 31 is configured to perform an LBT procedure on a plurality of carriers in parallel and to generate a trigger signal in response to LBT success on one or more carriers among the plurality of carriers. For example, the detecting block 31 may be implemented as a digital logic circuit such as field programmable gate array (FPGA), application specific integrated circuit (ASIC) and the like.

Each carrier may have a same or different carrier type (or carrier bandwidth) than another carrier in the plurality of carriers. The carrier configuration of the plurality of carriers may be determined in the carrier setup phase. The carrier configuration may at least include the total number M of the carriers, the bandwidth $B_i$ of each carrier, and the center frequency $\omega_i$ of each carrier, where i=0, 1 ... M−1. Once the carrier configuration is determined, it may be provided to the clipping pulse generator 32.

The LBT procedure may be performed by monitoring the channel status according to the protocols related to LAA specified by the 3rd generation partnership project (3GPP). The trigger signal may be generated whenever LBT success occurs on one or more carriers, which means traffic shall be sent over those carriers.

The generated trigger signal may indicate at least the identification information of the one or more carriers with LBT success. For example, assume there are 6 carriers C0-C5 in the current carrier configuration and LBT success occurs on C0 and C1. Then, the trigger signal may indicate C0 and C1 to the clipping pulse generator 32. Alternatively, the trigger signal may indicate the value (1,1,0,0,0,0), where the value 1 denotes the occurrence of LBT success and the value 0 denotes the absence of LBT success.

The Clipping Pulse Generator

The clipping pulse generator 32 is configured to, in response to the trigger signal, generate, for the one or more carriers with LBT success, a clipping pulse within a time period from the receipt of the trigger signal to the start of user traffic transmission on the one or more carriers. The time period is shown as $[T_1, T_2']$ in FIG. 2, which has been described above.

Figure 4A:
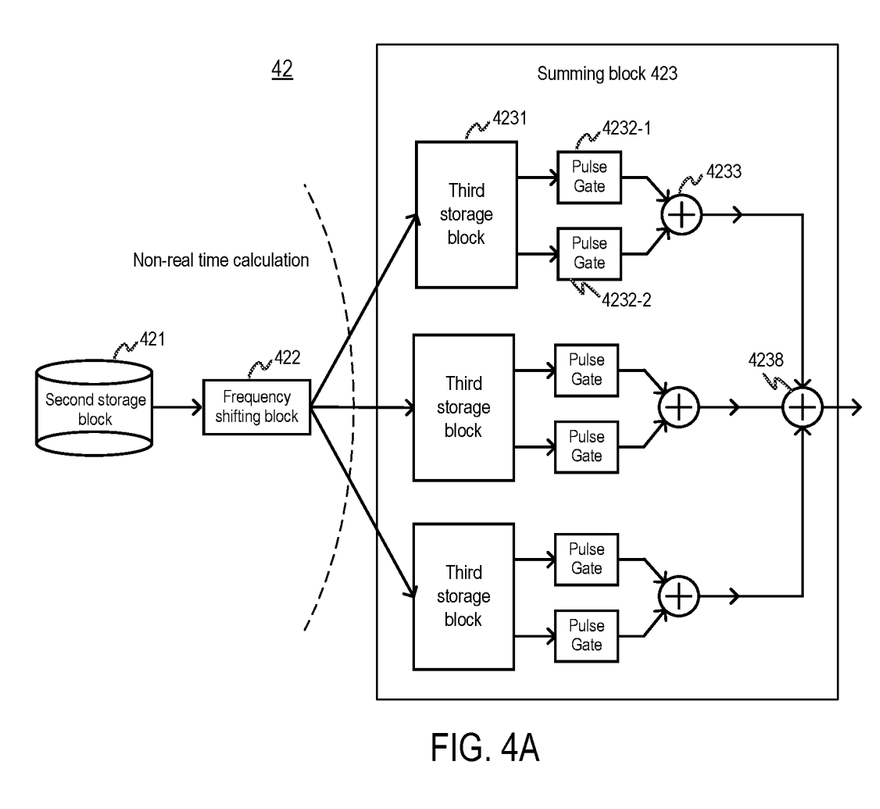
FIGS. 4A-4B are block diagrams each showing a clipping pulse generator according to an embodiment of the disclosure.

As a first example, the clipping pulse generator 32 may be implemented as a clipping pulse generator 42 which comprises a second storage block 421, a frequency shifting block 422 and a summing block 423, as shown in FIG. 4A.

The second storage block 421 is configured to store basis functions of the plurality of carriers. The basis function for a carrier can be used for calculating the component clipping pulse for the carrier, as described later. The basis function is per carrier type and may be denoted as $f(n,B_i)$, where $B_i$ is the bandwidth of each carrier as mentioned above and n (=0, 1 ... N−1) is the time index.

The frequency shifting block 422 is configured to apply corresponding frequency shifts to the basis functions of the plurality of carriers. Specifically, once receiving the carrier configuration from the detecting block 31, the corresponding basis function may be chosen for each carrier according to its carrier bandwidth and the corresponding frequency shift may be applied as follows:

$$C_i(n)=f(n,B_i)e^{jn\omega_i},$$

where $C_i(n)$ denotes the component clipping pulse for each carrier.

Thus, the component clipping pulse $C_i(n)$ can keep unchanged as long as there is no change in the carrier configuration. Since the carrier configuration change rarely happens in field, the calculation of the frequency shifting block 422 can be performed only once if there is a change in the carrier configuration. In view of this, the frequency shifting block 422 can be implemented as a non-real time calculation block. For example, the frequency shifting block 422 may be implemented by executing software on a CPU system, and the second storage block 421 may be implemented as an external memory, such as the CPU system memory, to save on-chip memory.

It should be noted that the present disclosure is not limited to the above example. As another example, it is also possible that the frequency shifting block 422 is implemented as a digital logic circuit and the second storage block 421 is implemented as an internal memory on the digital logic circuit.

The summing block 423 is configured to calculate a sum of the frequency-shifted basis functions of the one or more carriers with LBT success. The summing block 423 may be implemented as a real time calculation block that performs the calculation in response to the trigger signal. For example, it may be implemented as a digital logic circuit such as FPGA, ASIC and the like.

For example, the summing block 423 may comprise one or more calculation branches (e.g., 3 calculation branches in FIG. 4A) each of which comprises a third storage block 4231, two pulse gates 4232-1 and 4232-2, and a first summator 4233. In the case where there are multiple branches, the summing block 423 may further comprise a second summator 4238. Although two pulse gates are shown, it is also possible to use more than two pulse gates for a calculation branch.

The third storage block 4231 is configured to store the frequency-shifted basis functions of the plurality of carriers. These frequency-shifted basis functions may be downloaded from the frequency shifting block 422. The two pulse gates 4232-1 and 4232-2 are configured to assign corresponding weights to the frequency-shifted basis functions of two carriers read from the third storage block 4231, where the weight 0 is assigned to the carrier without LBT success and the weight 1 is assigned to the carrier with LBT success. The pulse gates may be controlled by the trigger signal from the detecting block 31 to assign the weights. In the above example where the trigger signal indicates the value (1,1,0, 0,0,0), both pulse gates 4232-1 and 4232-2 in the uppermost branch will pass the corresponding frequency-shifted basis functions according to the signal value "1", while the other pulse gates will gate the corresponding frequency-shifted basis functions to zero according to the signal value "0".

The first summator 4233 is configured to calculate a sum of the weighted frequency-shifted basis functions. The second summator 4238 is configured to add the sums from the plurality of branches as follows:

$$C(n) = \sum_{i=0}^{M-1} g_i C_i(n),$$

$$g_i = \begin{cases} 1 & LBT \text{ success on carrier } i \\ 0 & \text{othersie} \end{cases},$$

where C(n) is the (final combined) clipping pulse for the one or more carriers with LBT success. The obtained C(n) may be downloaded to the first storage block 33 for subsequent use.

Figure 4B:
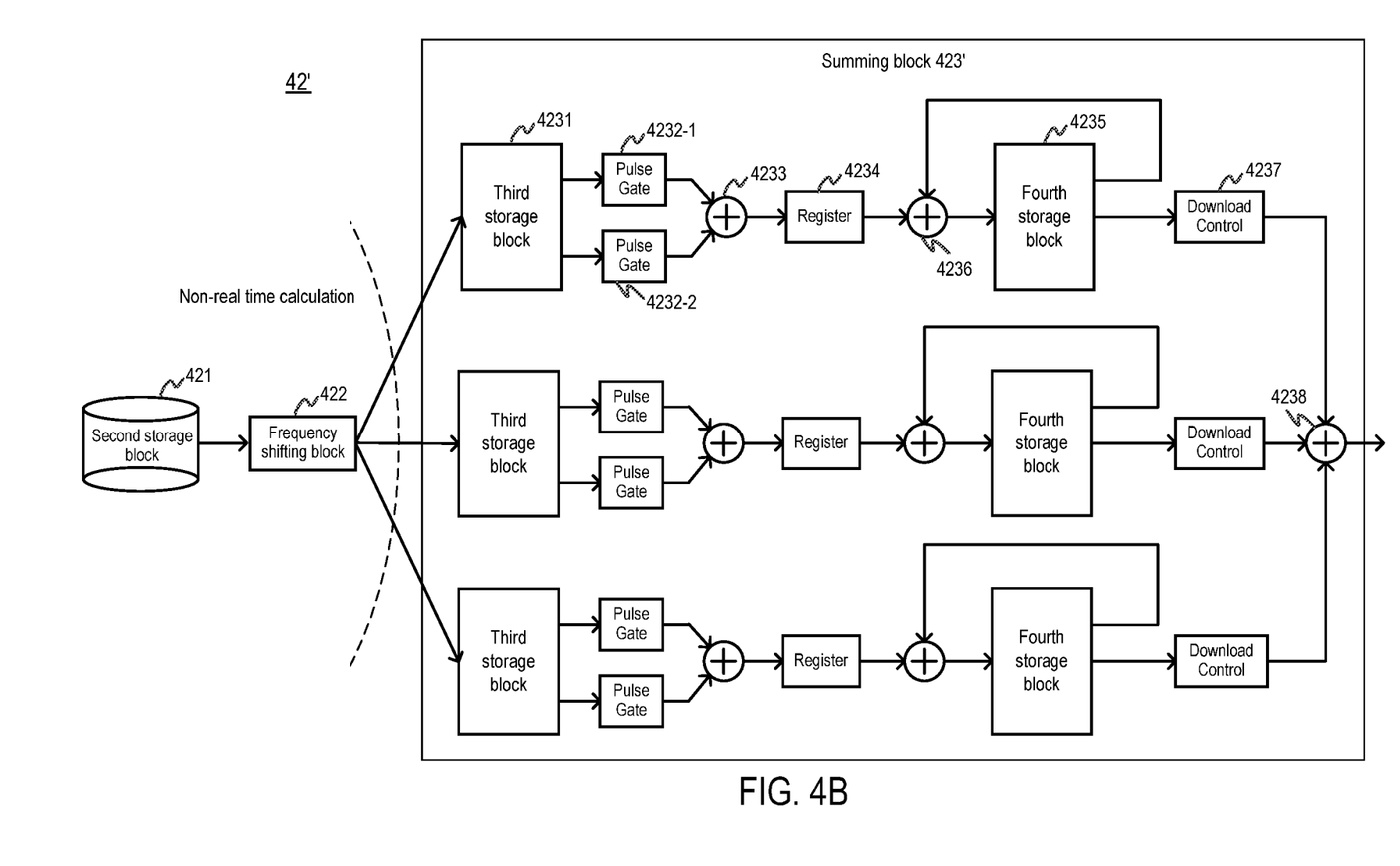

As a second example, the clipping pulse generator 32 may be implemented as a clipping pulse generator 42' which comprises the second storage block 421, the frequency shifting block 422 and a summing block 423', as shown in FIG. 4B. The difference between the clipping pulse generators 42' and 42 lies in that the summing block 423' has a pipelined structure.

Specifically, there are two pipeline stages. The first pipeline stage includes the third storage block 4231, the two pulse gates 4232-1 and 4232-2, the first summator 4233 and a register 4234. The second pipeline stage includes the register 4234, a fourth storage block 4235, a third summator 4236 and a download control element 4237. The register 4234 is used in both pipelined stages.

The register 4234 is configured to save a first sum calculated by the first summator 4233 for the current two carriers. The fourth storage block 4235 is configured to store a second sum corresponding to all the carriers which have undergone the first summator 4233 previously. In other words, the fourth storage block 4235 can work as a memory for storing the temporary result. The third summator 4236 is configured to calculate a third sum of the first and second sums. Then, the third sum can be stored into the fourth storage block 4235 as a new second sum to replace the old second sum. Note that during the first period for calculating the first sum for the first two carriers, the second sum is initialized to zero in the fourth storage block 4235. In this way, the component clipping pulses are added in a pipelined, recursive way to reduce the required resource.

The download control element 4237 is configured to download the final second sum from the fourth storage block 4235 to the second summator 4238. The second summator 4238 can add the final second sums from the plurality of branches as described above. The obtained clipping pulse may be downloaded to the first storage block 33 for subsequent use.

Figure 5:
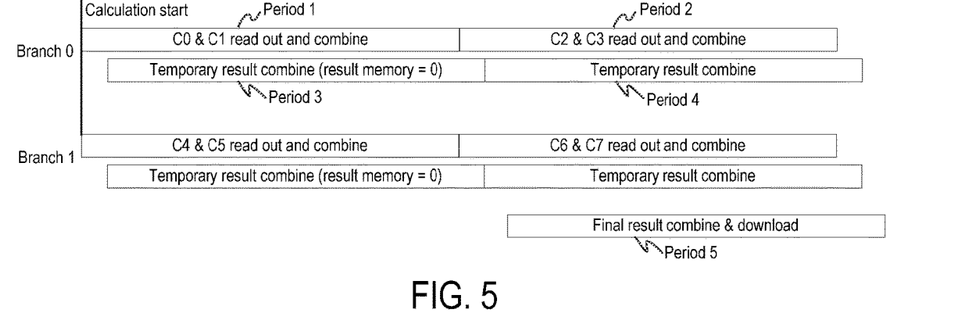
FIG. 5 is a schematic diagram for explaining the clipping pulse generator shown in FIG. 4B.

FIG. 5 is a schematic diagram for explaining the clipping pulse generator shown in FIG. 4B. In this exemplary example, there are 8 carriers in the carrier configuration and two calculation branches in the summing block. As shown, for branch 0, the first pipeline stage reads out and combines the weighted component clipping pulses of two carriers C0 and C1 in period 1. The second pipeline stage combines a first result calculated for C0 and C1 with the temporary result (initialized to zero) to update the temporary result to the first result in period 3. The period 3 partly overlaps with the period 1.

Then, the first pipeline stage reads out and combines the weighted component clipping pulses of two carriers C2 and C3 in period 2. The second pipeline stage combines a second result calculated for C2 and C3 with the temporary result (the first result) to update the temporary result to a third result (the sum of the first and second results) in period 4. The period 4 partly overlaps with the period 2.

Similarly, for branch 1, the first pipeline stage reads out and combines the weighted component clipping pulses of two carriers C4 and C5 in the period 1. The second pipeline stage combines a fourth result calculated for C4 and C5 with the temporary result (initialized to zero) to update the temporary result to the fourth result in the period 3.

Then, the first pipeline stage reads out and combines the weighted component clipping pulses of two carriers C6 and C7 in the period 2. The second pipeline stage combines a fifth result calculated for C6 and C7 with the temporary result (the fourth result) to update the temporary result to a sixth result (the sum of the fourth and fifth results) in the period 4.

Finally, the two temporary results (the third and six results) are combined and downloaded by the second pipeline stage in period 5. The period 5 partly overlaps with the period 4. Since the processing periods of the two pipeline stages partly overlap with each other, the calculation time can be reduced.

The First Storage Block

The first storage block 33 is configured to store the clipping pulse. The clipping pulse may be downloaded from the clipping pulse generator 32. The first storage block 33 may be implemented as an internal memory such as on-chip memory, various random access memories (RAMs), and the like.

The Selecting Block

The selecting block 34 is configured to select the full clipping block 35 to process a multi-carrier signal corresponding to the plurality of carriers when there is user traffic on the one or more carriers, and to select the simplified clipping block 36 to process the multi-carrier signal when there is no user traffic on the plurality of carriers. The multi-carrier signal is a DL signal which is the sum of the signals on the plurality of carriers. The DL signal may be provided from a baseband unit.

Since the detecting block 31 knows the LBT result on each carrier, the detecting block 31 can determine whether there is user traffic on any carrier in each subframe (or slot) according to the LBT result. Thus, the selecting block 34 may perform the selection according to a control signal from the detecting block 31. For example, if the control signal indicates the binary value "10" during a subframe (or slot), the selecting block 34 may be controlled to select the full clipping block 35. On the other hand, if the control signal indicates the binary value "01" during a subframe (or slot), the selecting block 34 may be controlled to select the simplified clipping block 36.

Figure 6A:
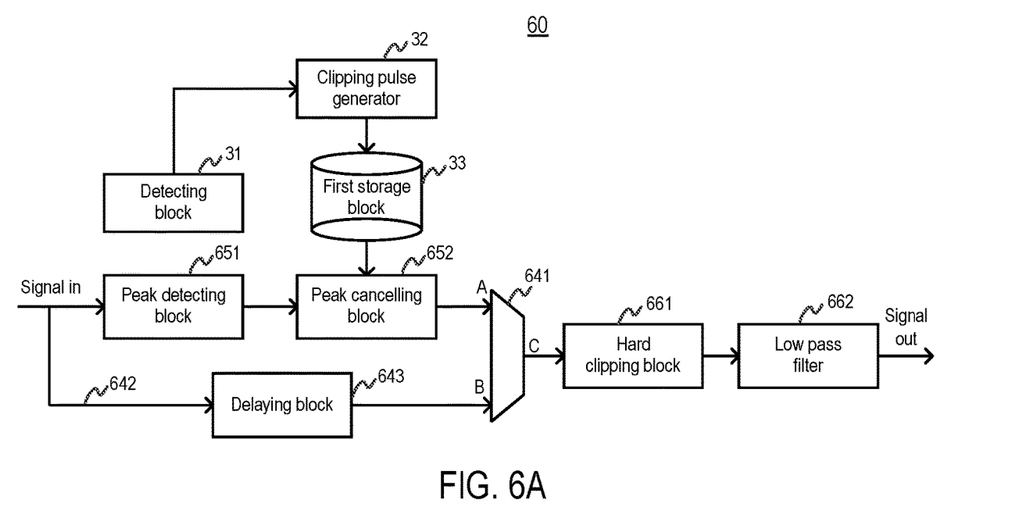
FIGS. 6A-6D are block diagrams for explaining the processing device shown in FIG. 3.

For example, the selecting block 34 may be implemented as shown in FIGS. 6A-6D. FIG. 6A shows a processing device 60 which is an exemplary example of the processing device 30. In this example, the selecting block 34 is implemented as a multiplexer 641 and a bypassing path 642. In addition, the full clipping block 35 is implemented as a peak detecting block 651 and a peak cancelling block 652, which will be described later. The simplified clipping block 36 is implemented as a hard clipping block 661 and a low pass filter 662, which will be described later.

As shown in FIG. 6A, the multiplexer 641 has a first input port A, a second input port B and an output port C. The first input port A is connected to an output of the full clipping block 35 which is implemented as a peak detecting block 651 and a peak cancelling block 652 described later. The second input port B is connected to one end of the bypassing path 642. The output port C is connected to an input of the simplified clipping block 36 which is implemented as a hard clipping block 661 and a low pass filter 662 described later. That is, the full clipping block 35 is connected in series with the simplified clipping block 36.

The other end of the bypassing path 643 is connected with an input of the full clipping block 35 to receive the multi-carrier signal. The bypassing path 643 comprises a delaying block 643 configured to apply to the multi-carrier signal the same delay as applied by the full clipping block 35. This can ensure that there is no delay change when switching the path.

The multiplexer 641 is configured to output the multi-carrier signal from the first input port A when there is user traffic on the one or more carriers, and to output the multi-carrier signal from the second input port B when there is no user traffic on the plurality of carriers. This may be achieved by using the control signal from the detecting block 31 as described above. In this way, the full clipping block 35 can be bypassed and only the simplified clipping can be applied if there is no user traffic on all the carriers. It should be noted that since both paths always have signals travelling therethrough, the full clipping block 35 may be configured to work or stop working when there is no user traffic on all the carriers.

Figure 6B:
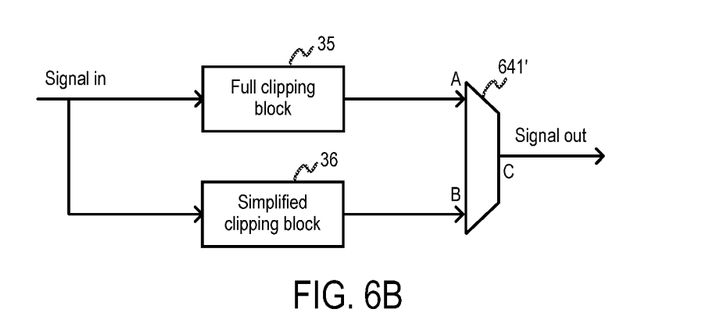

As another example, the selecting block 34 may be implemented as a multiplexer 641' shown in FIG. 6B. The multiplexer 641' is similar to the multiplexer 641 except that the second input port B is connected to an output of the simplified clipping block 36 and the output port C outputs the processed signal directly. That is, the full clipping block 35 and the simplified clipping block 36 are connected in parallel.

Figure 6C:
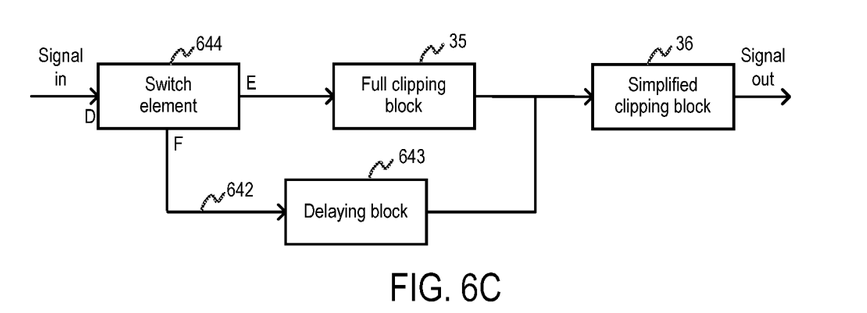

As still another example, the selecting block 34 may be implemented as a switch element 644 and the bypassing path 642 shown in FIG. 6C. The switch element 644 has an input port D, a first output port E and a second output port F. The input port D is configured to receive the multi-carrier signal. The first output port E is configured to output the multi-carrier signal when there is user traffic on any one of the plurality of carriers. The second output port F is configured to output the multi-carrier signal when there is no user traffic on the plurality of carriers. The difference between the selecting blocks of FIGS. 6C and 6A lies in that FIG. 6C performs the selection at the input side, while FIG. 6A perform the selection at the output side.

Figure 6D:
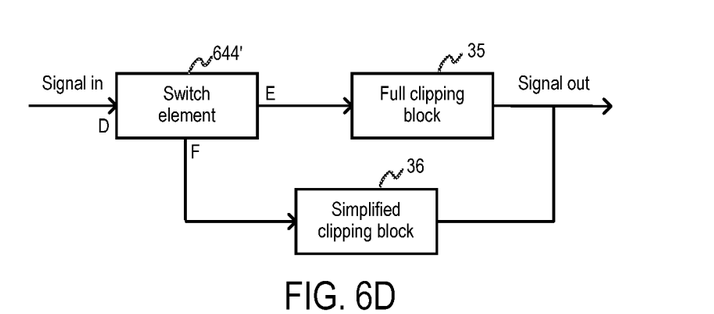

As still another example, the selecting block 34 may be implemented as a switch element 644' shown in FIG. 6D. The switch element 644' is similar to the switch element 644 except that the second output port F is connected to an input of the simplified clipping block 36. That is, the full clipping block 35 and the simplified clipping block 36 are connected in parallel.

The Full Clipping Block

The full clipping block 35 is configured to clip a peak in the multi-carrier signal based on the clipping pulse. The full clipping block 35 may be implemented as a digital logic circuit such as FPGA, ASIC and the like. For example, as shown in FIG. 6A, the full clipping block 35 may be implemented as a peak detecting block 651 and a peak cancelling block 652.

The peak detecting block 651 is configured to detect a peak in the multi-carrier signal. For example, the amplitude of the multi-carrier signal may be compared with a predetermined threshold to determine whether the multi-carrier signal has a peak within a time interval. The peak cancelling block 652 is configured to apply the clipping pulse to the multi-carrier signal to reduce the peak. For example, within the detected time interval corresponding to the peak, the clipping pulse may be subtracted from the multi-carrier signal to reduce the peak.

The Simplified Clipping Block

The simplified clipping block 36 is configured to apply a simplified clipping to the multi-carrier signal without using the clipping pulse. For example, as shown in FIG. 6A, the simplified clipping block 36 may be implemented as a hard clipping block 661 and a low pass filter 662.

The hard clipping block 661 is configured to apply a hard clipping to the multi-carrier signal. For example, the hard clipping may be defined as:

$$x_c(n) = \begin{cases} x(n) & |x(n)| < A \\ \dfrac{Ax(n)}{|x(n)|} & |x(n)| \geq A \end{cases},$$

where x(n) denotes the multi-carrier signal, |x(n)| is the amplitude of the multi-carrier signal, A is a predetermined threshold for peak detection, and $x_c(n)$ denotes the hard-clipped multi-carrier signal.

The low pass filter 662 is configured to apply low pass filtering to the hard-clipped multi-carrier signal. This can reduce the unwanted out-of-band emissions caused by the hard clipping. It should be noted that although the hard clipping with low pass filtering will introduce in-band spectrum re-growth, this re-growth impact can be ignored since the peak rarely happens on the low power signal. It should also be noted that the present disclosure is not limited to the above example and any other suitable clipping may be used instead.

Although the processing device has been described in the context of the radio unit in a base station, those skilled in the art can understand that the principle of the present disclosure may also be applied to the radio unit of a terminal device, for example a user equipment, such as a mobile phone. In this case, the multi-carrier signal is an uplink (UL) signal.

Figure 7:
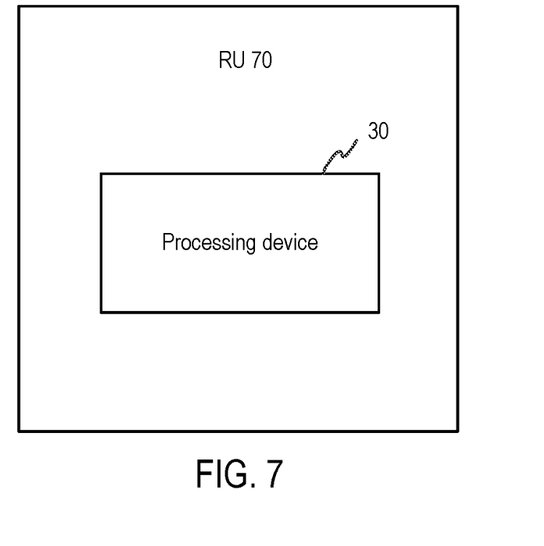
FIG. 7 is a block diagram showing a radio unit according to an embodiment of the disclosure.

FIG. 7 is a block diagram showing a radio unit (RU) according to an embodiment of the disclosure. As shown, the RU 70 comprises the processing device 30 described above. As an example, the RU 70 may be used in a base station. As another example, the RU 70 may be used in a terminal device. The other configurations of the RU for the base station or the terminal device may be well known to those skilled in the art, and thus the detailed description thereof is omitted here.

Figure 8:
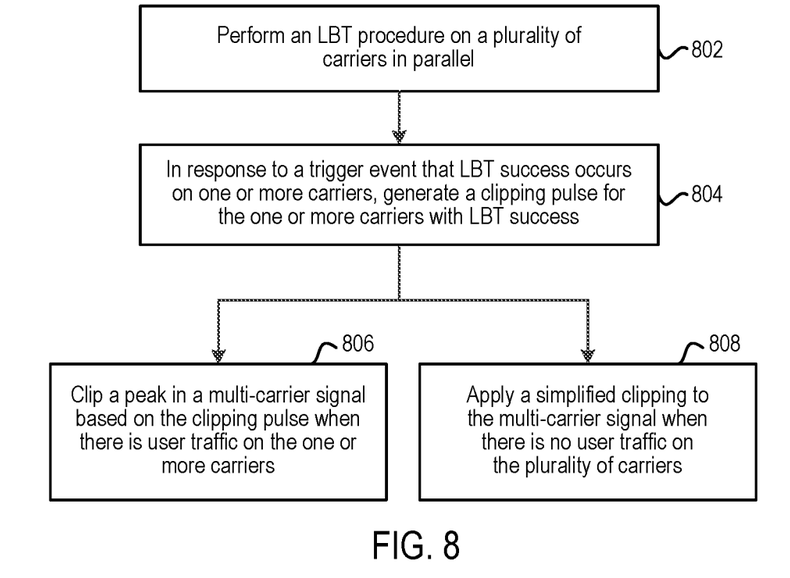
FIG. 8 is a flowchart illustrating a method according to an embodiment of the disclosure.

FIG. 8 is a flowchart illustrating a method according to an embodiment of the disclosure. At step 802, an LBT procedure is performed on a plurality of carriers in parallel. This may be implemented by the detecting block 31 as described above. At step 804, in response to a trigger event that LBT success occurs on one or more carriers among the plurality of carriers, a clipping pulse is generated for the one or more carriers with LBT success within a time period from the occurrence of the trigger event to the start of user traffic transmission on the one or more carriers.

Figure 9:
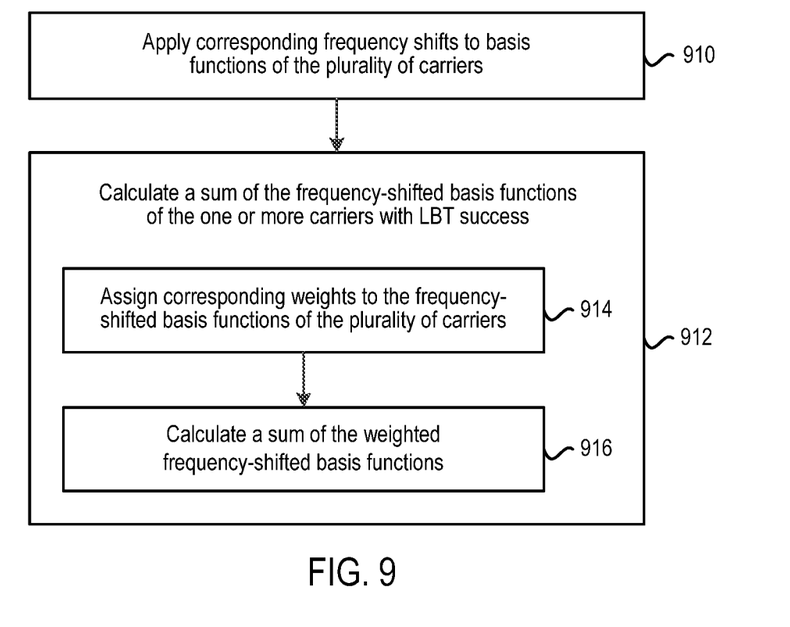
FIG. 9 is a flowchart for explaining the method of FIG. 8.
Figure 10:
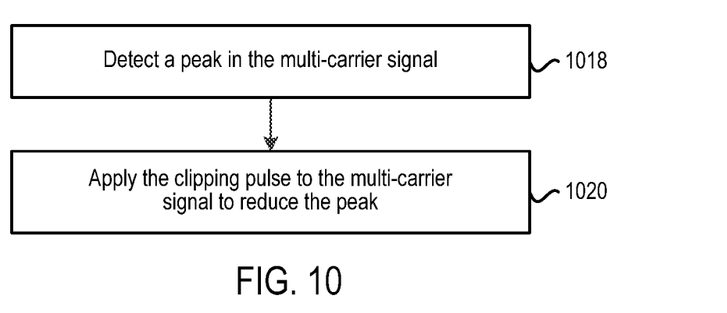
FIG. 10 is another flowchart for explaining the method of FIG. 8.
Figure 11:
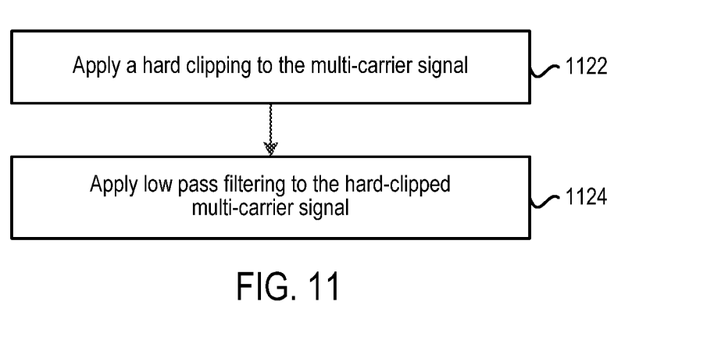
FIG. 11 is another flowchart for explaining the method of FIG. 8.

For example, step 804 may be implemented as steps 910 and 912 shown in FIG. 9. At step 910, corresponding frequency shifts are applied to basis functions of the plurality of carriers. This step may be implemented by the second storage block 421 and the frequency shifting block 422 as described above. At step 912, a sum of the frequency-shifted basis functions of the one or more carriers with LBT success is calculated. This step may be implemented by the summing block 423 or 423' as described above. Specifically, step 912 may be implemented as steps 914 and 916.

At step 914, corresponding weights are assigned to the frequency-shifted basis functions of the plurality of carriers, where zero is assigned to the carrier without LBT success and one is assigned to the carrier with LBT success. At step 916, a sum of the weighted frequency-shifted basis functions is calculated.

Referring back to FIG. 8, at step 806, a peak in a multi-carrier signal corresponding to the plurality of carriers is clipped based on the clipping pulse when there is user traffic on the one or more carriers. This step may be implemented by the first storage block 33, the selecting block 34 and the full clipping block 35 as described above. For example, step 806 may be implemented as steps 1018 and 1020 shown in FIG. 10. At step 1018, a peak in the multi-carrier signal is detected. At step 1020, the clipping pulse is applied to the multi-carrier signal to reduce the peak.

Referring back to FIG. 8, at step 808, a simplified clipping is applied to the multi-carrier signal without using the clipping pulse when there is no user traffic on the plurality of carriers. This step may be implemented by the selecting block 34 and the simplified clipping block 36 as described above. For example, step 808 may be implemented as steps 1122 and 1124 shown in FIG. 11. At step 1122, a hard clipping is applied to the multi-carrier signal. At step 1124, low pass filtering is applied to the hard-clipped multi-carrier signal.

Since the components for performing the above steps have been detailed above, the details of the above steps are omitted here. It should be noted that two steps shown in succession may, in fact, be executed substantially concurrently, or the steps may sometimes be executed in the reverse order, depending upon the functionality involved.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and soon, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

It should be understood that, although the terms "first", "second" and soon may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A processing device for use in a licensed assisted access (LAA) radio system, the processing device comprising:

in response to listen-before-talk (LBT) success on one or more carriers among a plurality of carriers, a pulse generator to generate, for the one or more carriers with LBT success, a clipping pulse;
a full clipper;
a simplified clipper; and
a selector to select the full clipper to clip a peak in a multi-carrier signal corresponding to the plurality of carriers, based on the clipping pulse, when there is user traffic on the one or more carriers, and to select the simplified clipper to apply a simplified clipping to the multi-carrier signal, without using the clipping pulse, when there is no user traffic on the plurality of carriers.

2. The processing device according to claim 1, wherein the pulse generator comprises:
a frequency shifter to apply corresponding frequency shifts to basis functions of the plurality of carriers to produce frequency-shifted basis functions; and
a summer to calculate a sum of frequency-shifted basis functions of the one or more carriers with LBT success.

3. The processing device according to claim 2, wherein the frequency shifter is implemented as a non-real time calculator that performs calculations when there is a change in carrier configuration; and wherein the summer is implemented as a real time calculator.

4. The processing device according to claim 2, wherein the summer comprises one or more calculation branches each of which comprises:
at least two pulse gates configured to assign corresponding weights to the frequency-shifted basis functions of at least two carriers, wherein zero is assigned to a carrier without LBT success and one is assigned to a carrier with LBT success; and
a summator to calculate a sum of the weighted frequency-shifted basis functions.

5. The processing device according to claim 4, wherein at least one of the one or more calculation branches has a pipelined structure.

6. The processing device according to claim 1, wherein the selector comprises a multiplexer having a first input port connected to an output of the full clipper, a second input port connected to one end of a bypassing path, and an output port connected to an input of the simplified clipper; wherein the other end of the bypassing path is connected with an input of the full clipper to receive the multi-carrier signal, and the bypassing path comprises a delay to apply to the multi-carrier signal a same delay as applied by the full clipper, and wherein the multiplexer is to output the multi-carrier signal from the first input port when there is user traffic on the one or more carriers, and to output the multi-carrier signal from the second input port when there is no user traffic on the plurality of carriers.

7. The processing device according to claim 1, wherein the selector comprises a multiplexer having a first input port connected to an output of the full clipper, a second input port connected to an output of the simplified clipper, and an output port to selectively output the multi-carrier signal from one of the first and second input ports; wherein an input of the simplified clipper is connected with an input of the full clipper to receive the multi-carrier signal; and wherein the multiplexer is to output the multi-carrier signal from the first input port when there is user traffic on the one or more carriers, and to output the multi-carrier signal from the second input port when there is no user traffic on the plurality of carriers.

8. The processing device according to claim 1, wherein the selector comprises a switch element having an input port to receive the multi-carrier signal, a first output port to output the multi-carrier signal when there is user traffic on any one of the plurality of carriers, and a second output port to output the multi-carrier signal when there is no user traffic on the plurality of carriers.

9. The processing device according to claim 8, wherein an input of the full clipper is connected to the first output port of the switch element, and an input of the simplified clipper is connected in series to an output of the full clipper, wherein the selector further comprises a bypassing path with one end connected to the second output port of the switch element and the other end connected to the output of the full clipper, and wherein the bypassing path comprises a delay to apply to the multi-carrier signal a same delay as applied by the full clipper.

10. The processing device according to claim 8, wherein an input of the full clipper is connected to the first output port of the switch element, and an input of the simplified clipper is connected to the second output port of the switch element; and wherein an output of the full clipper is connected with an output of the simplified clipper to output the multi-carrier signal.

11. The processing device according to claim 1, wherein the full clipper comprises:
a peak detector to detect a peak in the multi-carrier signal; and
a peak reducer to apply the clipping pulse to the multi-carrier signal to reduce the peak.

12. The processing device according to claim 1, wherein the simplified clipper comprises:
a hard clipper to apply a hard clipping to the multi-carrier signal; and
a low pass filter to apply low pass filtering to a hard-clipped multi-carrier signal.

13. A radio device for use in a licensed assisted access (LAA) radio system, the radio device including a processing device comprising:
in response to listen-before-talk (LBT) success on one or more carriers among a plurality of carriers, a pulse generator to generate, for the one or more carriers with LBT success, a clipping pulse;
a full clipper;
a simplified clipper; and
a selector to select the full clipper to clip a peak in a multi-carrier signal corresponding to the plurality of carriers, based on the clipping pulse, when there is user traffic on the one or more carriers, and to select the simplified clipper to apply a simplified clipping to the multi-carrier signal, without using the clipping pulse, when there is no user traffic on the plurality of carriers.

14. The radio device according to claim 13, wherein the radio device is a base station or a terminal device.

15. A method implemented in a licensed assisted access (LAA) radio system, the method comprising:
performing a listen-before-talk (LBT) procedure on a plurality of carriers;
in response to LBT success on one or more carriers among the plurality of carriers, generating, for the one or more carriers with LBT success, a clipping pulse;
clipping a peak in a multi-carrier signal corresponding to the plurality of carriers based on the clipping pulse when there is user traffic on the one or more carriers; and
applying a simplified clipping to the multi-carrier signal without using the clipping pulse when there is no user traffic on the plurality of carriers.

16. The method according to claim 15, wherein the generating the clipping pulse comprises:
   applying corresponding frequency shifts to basis functions of the plurality of carriers to produce frequency-shifted basis functions; and
   calculating a sum of frequency-shifted basis functions of the one or more carriers with LBT success.

17. The method according to claim 16, wherein the applying the corresponding frequency shifts is performed when there is a change in carrier configuration.

18. The method according to claim 16, wherein the calculating the sum of the frequency-shifted basis functions of the one or more carriers comprises:
   assigning corresponding weights to the frequency-shifted basis functions of the plurality of carriers, wherein zero is assigned to a carrier without LBT success and one is assigned to a carrier with LBT success; and
   calculating a sum of the weighted frequency-shifted basis functions.

19. The method according to claim 15, wherein clipping the peak in the multi-carrier signal comprises:
   detecting a peak in the multi-carrier signal; and
   applying the clipping pulse to the multi-carrier signal to reduce the peak.

20. The method according to claim 15, wherein the applying the simplified clipping comprises:
   applying a hard clipping to the multi-carrier signal; and
   applying low pass filtering to a hard-clipped multi-carrier signal.

* * * * *

UNITED STATES PATENT AND TRADEMARK OFFICE
CERTIFICATE OF CORRECTION

PATENT NO. : 11,297,649 B2
APPLICATION NO. : 17/026116
DATED : April 5, 2022
INVENTOR(S) : Wen et al.

It is certified that error appears in the above-identified patent and that said Letters Patent is hereby corrected as shown below:

In the Specification

In Column 9, in Equation, Lines 12-14, delete " $g_i = \begin{cases} 1 & LBT \text{ success on carrier } i \\ 0 & \text{othersie} \end{cases}$ ," and insert -- $g_i = \begin{cases} 1 & LBT \text{ success on carrier } i \\ 0 & \text{otherwise} \end{cases}$ --, therefor.

In Column 11, Line 10, delete "bypassing path 643" and insert -- bypassing path 642 --, therefor.

In Column 11, Line 12, delete "bypassing path 643" and insert -- bypassing path 642 --, therefor.

In Column 14, Line 19, delete "and soon," and insert -- and so on, --, therefor.

In Column 14, Line 31, delete "and soon" and insert -- and so on --, therefor.

Signed and Sealed this
Nineteenth Day of July, 2022

Katherine Kelly Vidal
*Director of the United States Patent and Trademark Office*